United States Patent [19]
Lu

[11] Patent Number: 6,122,555
[45] Date of Patent: *Sep. 19, 2000

[54] SYSTEM AND METHODS FOR GLOBALLY OPTIMIZING A PROCESS FACILITY

[75] Inventor: Zhuxin J. Lu, Phoenix, Ariz.

[73] Assignee: Honeywell International Inc., Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,288

[22] Filed: May 5, 1997

[51] Int. Cl.$^7$ .................................................. G05B 15/02
[52] U.S. Cl. .................................. 700/9; 700/44; 700/28
[58] Field of Search .................................. 700/2, 3, 8, 9, 700/19, 20, 96, 108, 44, 45, 100, 28, 29, 99; 705/8

[56] References Cited

U.S. PATENT DOCUMENTS

| | | |
|---|---|---|
| 4,319,320 | 3/1982 | Sato et al. .................................. 364/165 |
| 4,736,316 | 4/1988 | Wallman .................................. 364/149 |
| 4,745,758 | 5/1988 | Putnam et al. ............................. 60/676 |
| 4,855,896 | 8/1989 | Oho et al. .................................. 364/138 |
| 5,161,110 | 11/1992 | Dorchak .................................. 364/131 |
| 5,260,868 | 11/1993 | Gupta et al. ............................. 700/100 |
| 5,351,184 | 9/1994 | Lu .......................................... 364/165 |
| 5,481,456 | 1/1996 | Ogura ...................................... 364/132 |

FOREIGN PATENT DOCUMENTS

3715437  11/1987  Germany .

*Primary Examiner*—William Grant
*Assistant Examiner*—Steven R. Garland
*Attorney, Agent, or Firm*—Hitt Chwang & Gaines

[57] ABSTRACT

A control system and a method of operating the same are introduced that globally optimize associated processes within a process facility. The control system includes a global controller and many local controllers. The global controller monitors characteristics of the associated processes and generates, in response thereto, control data for optimizing the process facility. The local controllers monitor the associated processes and operate in accordance with the control data to varying degrees to control the monitored associated processes, thereby cooperating with the global controller to optimize the process facility.

60 Claims, 4 Drawing Sheets

SYSTEM AND METHODS FOR GLOBALLY OPTIMIZING A PROCESS FACILITY

CROSS-REFERENCE TO RELATED APPLICATIONS

The present invention is related to that disclosed in (1) U.S. Pat. No. 5,758,047, entitled "Method of Process Controller Optimization in a Multivariable Predictive Controller," and (2) U.S. patent application Ser. No. 08/851,590, now U.S. Pat. No. 6,055,483, filed concurrently herewith on May 5, 1997, entitled "Systems and Methods Using Bridge Models to Globally Optimize a Process Facility," both applications are commonly assigned to the assignee of the present invention. The disclosures of these related patent applications are incorporated herein by reference for all purposes as if fully set forth herein.

TECHNICAL FIELD OF THE INVENTION

The present invention is directed, in general, to control systems for process facilities and, more specifically, to control systems, and methods of operating such systems, that globally optimize a process facility.

BACKGROUND OF THE INVENTION

Presently, process facilities (e.g., a manufacturing plant, a mineral or crude oil refinery, etc.) are managed using distributed control systems. Contemporary control systems include numerous modules tailored to control or monitor various associated processes of the facility. Conventional means link these modules together to produce the distributed nature of the control system. This affords increased performance and a capability to expand or reduce the control system to satisfy changing facility needs.

Process facility management providers, such as HONEYWELL, INC., develop control systems that can be tailored to satisfy wide ranges of process requirements (e.g., global, local or otherwise) and facility types (e.g., manufacturing, refining, etc.). Such providers have two principle objectives. The first objective is to centralize control of as many processes as possible to improve an overall efficiency of the facility. The second objective is to support a common interface that communicates data among various modules controlling or monitoring the processes, and also with any such centralized controller or operator center.

Each process, or group of associated processes, has certain input (e.g., flow, feed, power, etc.) and output (e.g., temperature, pressure, etc.) characteristics associated with it. In recent years, model predictive control ("MPC") techniques have been used to optimize certain processes as a function of such characteristics. One MPC technique uses algorithmic representations of certain processes to estimate characteristic values (represented as parameters, variables, etc.) associated with them that can be used to better control such processes. In recent years, physical, economic and other factors have been incorporated into control systems for these associated processes. Examples of such techniques are described in U.S. Pat. No. 5,351,184 entitled "METHOD OF MULTIVARIABLE PREDICTIVE CONTROL UTILIZING RANGE CONTROL;" U.S. Pat. No. 5,561,599 entitled "METHOD OF INCORPORATING INDEPENDENT FEEDFORWARD CONTROL IN A MULTIVARIABLE PREDICTIVE CONTROLLER;" U.S. Pat. No. 5,572,420 entitled "METHOD OF OPTIMAL CONTROLLER DESIGN OF MULTIVARIABLE PREDICTIVE CONTROL UTILIZING RANGE CONTROL;" and U.S. Pat. No. 5,574,638 entitled "METHOD OF OPTIMAL SCALING OF VARIABLES IN A MULTIVARIABLE PREDICTIVE CONTROLLER UTILIZING RANGE CONTROL," all of which are commonly owned along by the assignee of the present invention and incorporated herein by reference for all purposes (the foregoing issues patents and U.S. patent application Ser. No. 08/490,499, now U.S. Pat. NO. 5,758,047, previously incorporated herein by reference, are collectively referred to hereinafter as the "HONEYWELL Patents and Application").

A problem however is that such optimization efforts, when applied to specific processes, are non-cooperative (non-global or non-facility wide) and may, and all too often do, detrimentally impact the efficiency of the process facility as a whole. One approach to resolve this global problem has been to: (1) communicate all pertinent process information from the local controllers to a centralized controller, and (2) establish a "selective" master-slave relationship between the controllers such that: (a) the local controllers continue to locally optimize their respective associated process, and (b) the centralized controller is capable of responding to certain of the pertinent process information to direct particular process(es) to operate at a certain level (e.g., stop, reduced utilization, etc.).

A primary problem with this approach is that it is responsive to emergency situations or extreme circumstances, and as such fails to provide a cooperative (global or facility wide) approach that optimizes not only individual processes, but the facility as a whole. What is needed in the art is a powerful and flexible means for dynamically optimizing a process facility as a whole through a cooperation between a global facility control and the many local (individual or group) process controllers.

SUMMARY OF THE INVENTION

To address the above-discussed deficiencies of the prior art, it is a primary object of the present invention to provide dynamic optimization of an automated process facility as a whole. As described above, a typical process facility includes many associated processes, various ones of which are associated with different stages of the overall process (e.g., natural resource refining, filtration, gas/oil separation, fabrication and other like processes). The present invention achieves global dynamic optimization through a cooperation between a global facility control and many local (individual or group) process controls.

In the attainment of this primary object, the present invention provides a control system and a method of operating the same for controlling associated processes within a process facility. The control system includes a global controller and a plurality of local controllers. The global controller monitors characteristics of the associated processes and generates, in response thereto, control data for optimizing the process facility. This controller is "global" because it monitors all, or at least a substantial number, of the associated processes. Monitoring the associated processes may be accomplished directly, indirectly (e.g., through certain local controllers), or through a suitable combination thereof by the global controller.

The local controllers monitor the associated processes and operate in accordance with the control data to varying degrees to control the monitored associated processes, thereby cooperating with the global controller to optimize the process facility. These controllers are "local" because each is associated with a specific one or group of associated processes, regardless of the physical location of the local controllers with respect to the associated processes.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
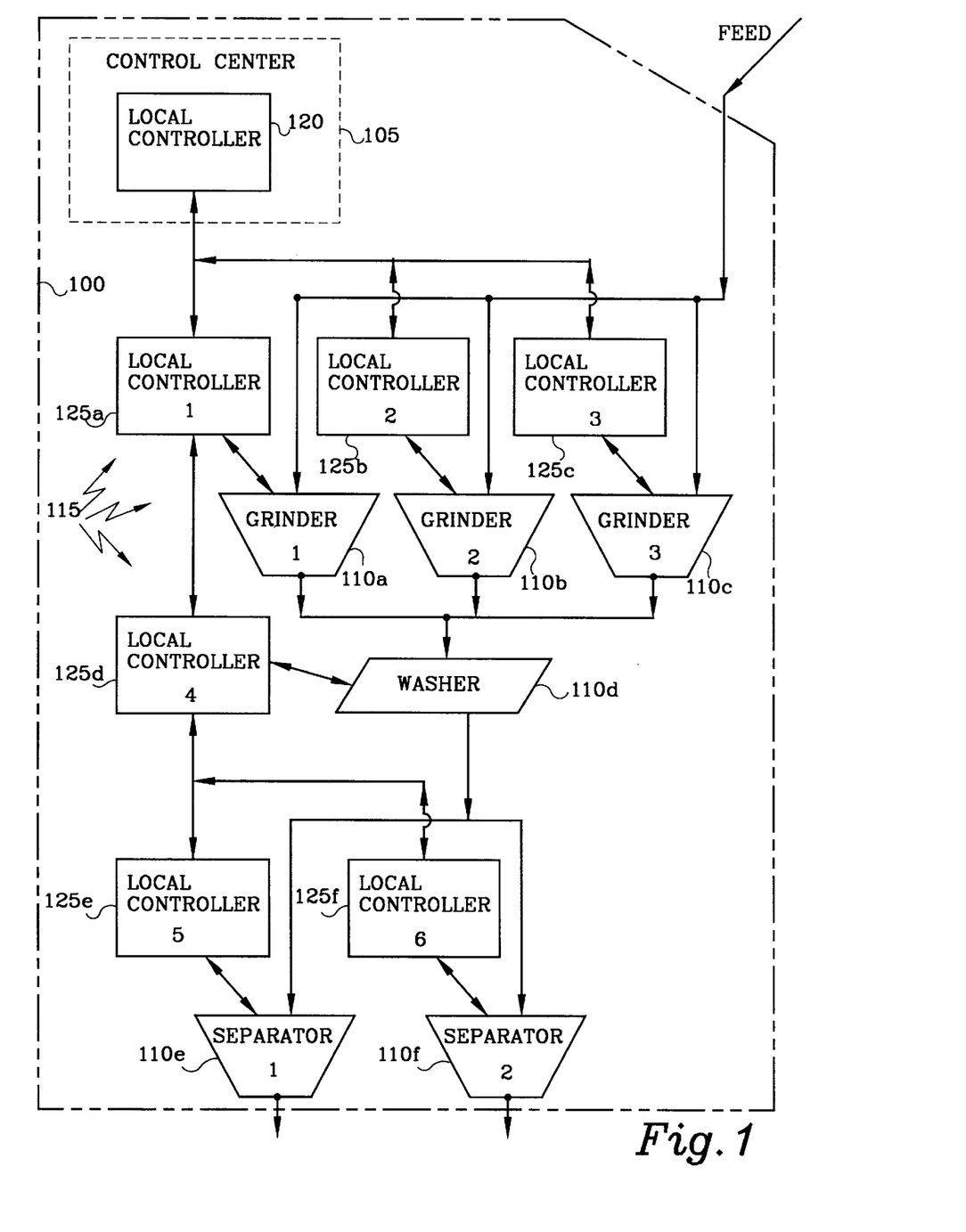
FIG. 1 illustrates a simple block diagram of a process facility with which a control system according to the principles of the present invention may be used.

Referring initially to FIG. 1, illustrated is a simple block diagram of a process facility 100. Exemplary process facility 100 operates to process raw materials, and includes a control center 105, six associated processes 110a to 110f that are arranged in three stages and a control system (generally designated 115). The term "include," as used herein, means inclusion without limitation. It should be noted that FIG. 1 (as well as FIGS. 2 to 4, discussed hereinbelow) and the various embodiments used to describe the principles of the present invention in this patent document are illustrative only. Those skilled in the art will understand that such principles may be implemented and used to globally optimize any suitably arranged process facility.

Exemplary control center 105 illustrates a central area that is commonly operator manned (not shown) for monitoring and controlling the three exemplary process stages. A first process stage includes three raw material grinders 110a to 110c that operate to receive a "feed" of raw material core and grind the 20 same, such as using a pulverizer or grinding wheel, into smaller particles of raw material. The term "or," as used herein, is inclusive, meaning and/or. The second process stage includes a washer 110d that operates to receive the ground raw materials and clean the same to remove residue from the first stage. The third process stage includes a pair of separators 110e and 110f that operate to receive the ground and washed raw materials and separate the same, such as into desired minerals and any remaining raw materials. Since this process facility is provided for purposes of illustration only and the principles of such a facility are well known, further discussion of the same is beyond the scope of this patent document and unnecessary.

Exemplary control system 115 illustratively includes a global controller 120 and six local controllers 125a to 125f, each of which is implemented in software and executable by a suitable conventional computing system (standalone or network), such as any of HONEYWELL, INC.'s AM K2LCN, AM K4LCN, AM HMPU, AxM or like systems. Those skilled in the art will understand that such controllers may be implemented in hardware, software, or firmware, or some suitable combination of the same; in general, the use of computing systems in control systems for process facilities is well known.

Global controller 120 is associated with each of local controllers 125, directly or indirectly, to allow communication of information therebetween. The phrase "associated with" and derivatives thereof, as used herein, may mean to include within, interconnect with, contain, be contained within, connect to or with, couple to or with, be communicable with, cooperate with, interleave, be a property of, be bound to or with, have, have a property of, or the like.

Global controller 120 monitors characteristics (e.g., status, temperature, utilization, efficiency, cost and other economic factors, etc.) of associated processes 110, either directly or indirectly (as shown, through local controllers 125 associated with processes 110). Depending upon the implementation, such monitoring may be of an individual process, group of processes, the facility as a whole, or otherwise. Global controller 120 generates, in response thereto, control data that is communicated via local controllers 125 to associated processes 110 to optimize process facility 100. The phrase "control data," as used herein, is defined as any numeric, qualitative or other value generated by global controller 120 to globally control (e.g., direct, manage, modify, recommend to, regulate, suggest to, supervise, cooperate, etc.) a particular process, a group of processes, a facility, a process stage, a group of stages, a sequence of processes or stages, or the like to optimize the facility as a whole—in a preferred embodiment, the control data is dynamically generated and is based at least upon a given facility's efficiency, production or economic cost, and most preferably all three.

Local controllers 125 monitor associated processes 110 and operate to varying degrees in accordance with the control data to control the associated processes, and, more particularly, to modify one or more processes and improve the monitored characteristics and the facility as a whole. The present invention enables both global and local monitoring, and cooperative control of associated processes 110 using these varying degrees of compliance with the control data. As will be described in greater detail hereinbelow, the varying degrees of compliance by local controllers 125 may range between full compliance and noncompliance. The relationship between global controller 120 and various ones of local controllers 110 may be master-slave (full compliance), cooperative (varying compliance, such as using the control data as a factor in controlling the associated processes), complete disregard (noncompliance).

Depending upon the implementation and needs of a given facility, the relationship between global controller 120 and specific local controllers 125 may be static (i.e., always only one of compliance, cooperative, or noncompliance), dynamic (i.e., varying over time, such as within a range between compliance and noncompliance, some lesser range therebetween, or otherwise), or varying therebetween.

As will become clearer hereinafter, an important aspect of the present invention is that one or more specific processes 110, and facility 100 as a whole, may be dynamically and cooperatively controlled as a function of local and global optimization efforts, and such dynamic and cooperative control is independent of the relationship between global controller 120 and specific local controllers 125, as described hereinabove.

Figure 2:
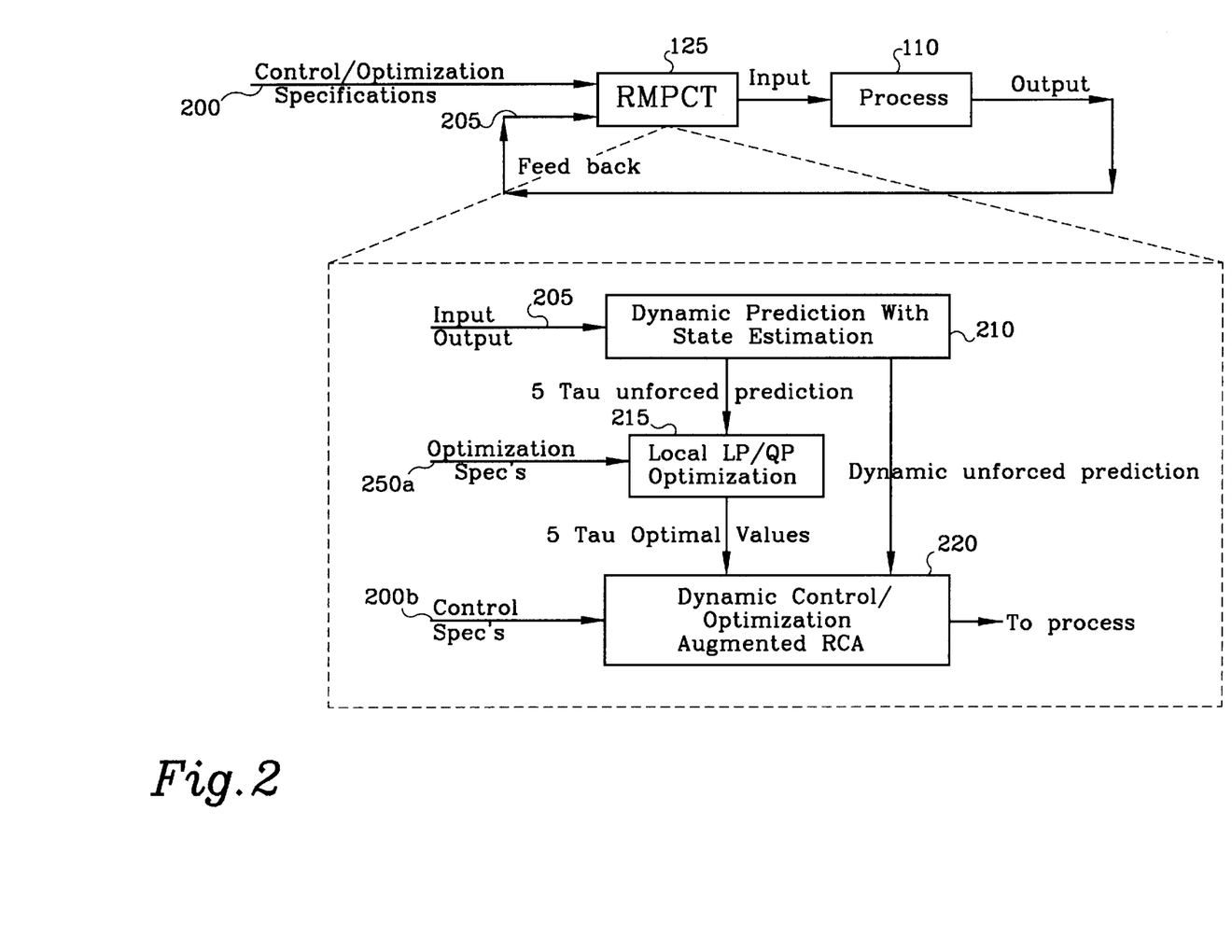
FIG. 2 illustrates a block diagram of an exemplary local controller that may be suitably associated with an associated process.

Turning now to FIG. 2, illustrated is a block diagram of an exemplary local controller 125 associated with a particular one or group of associated processes 110. Local controller 125 is a RMPC (robust multi-variable predictive control) structure developed by HONEYWELL, INC., the function of which is the subject of and described in detail in the HONEYWELL Patents and Application, all of which were previously incorporated hereinabove by reference as if fully set forth in this patent document. As such, the present description only introduces certain relative features of local controller 125.

According to the illustrated embodiment, local controller 125 receives as inputs, control/optimization specifications 200 (e.g., bounds, ranges, tolerances, control points, etc.) and feedback data 205 (e.g., output of associated process 110). Control/optimization specifications 200 may be received from any of a number of sources depending upon the associated process or group of associated processes 110, facility 100 or other factor. For example, any of control/optimization specifications 200 may be received from an operator of control center 105, retrieved from a database or data repository, received from other local controllers 125 or global controller 120, etc.

Control/optimization specifications 200 include two types of variables: (1) a first variable ("MV") that may be manipulated, such as flow, feed, air blower, etc; and (2) a second variable ("DV") that cannot be manipulated and is a disturbance variable, such as burn rate, fuel quality per unit, etc. Feedback data 205 is a third variable ("CV") that is responsive to MVs and DVs, and is an output of associated process 110, such as pressure, temperature, etc. Any or all of such MVs, DVs and CVs represent characteristics of associated process 110 that may be suitably monitored by local controller 125 and, directly or indirectly, by global controller 120.

Local controller 125 includes a dynamic prediction task with state estimation 210, a local linear program/quadratic program ("LP/QP") optimization task 215 and a dynamic control/optimization augmented range control algorithm ("RCA") 220. Exemplary dynamic prediction task 210 receives CVs and operates to generate an array of multiple predictions (or dynamic unforced predictions) and, at 5 tau (response time close to end), an unforced prediction for values associated with associated process 110. Exemplary local LP/QP optimization task 215 receives optimization specifications 200a and, in response to the unforced prediction, operates to generate, at 5 tau, optimal values associated with associated process 110. Most preferably, optimization specifications 200a are associated, directly or indirectly, with an economic value of the output of associated process 110. Exemplary dynamic control/optimization augmented RCA 220 receives control specifications 200b and, in response to receiving the array of multiple predictions (from dynamic prediction task 210) and the optimal values (from local LP/QP optimization task 215), operates to generate control values that are input to associated process 110.

It should be noted that an important aspect of exemplary local controller 125 is the use of control/optimization specifications 200 and feedback data 205 to locally unify economic/operational optimization with MPC (model predictive control) dynamically for a specific process or group of processes.

Figure 3:
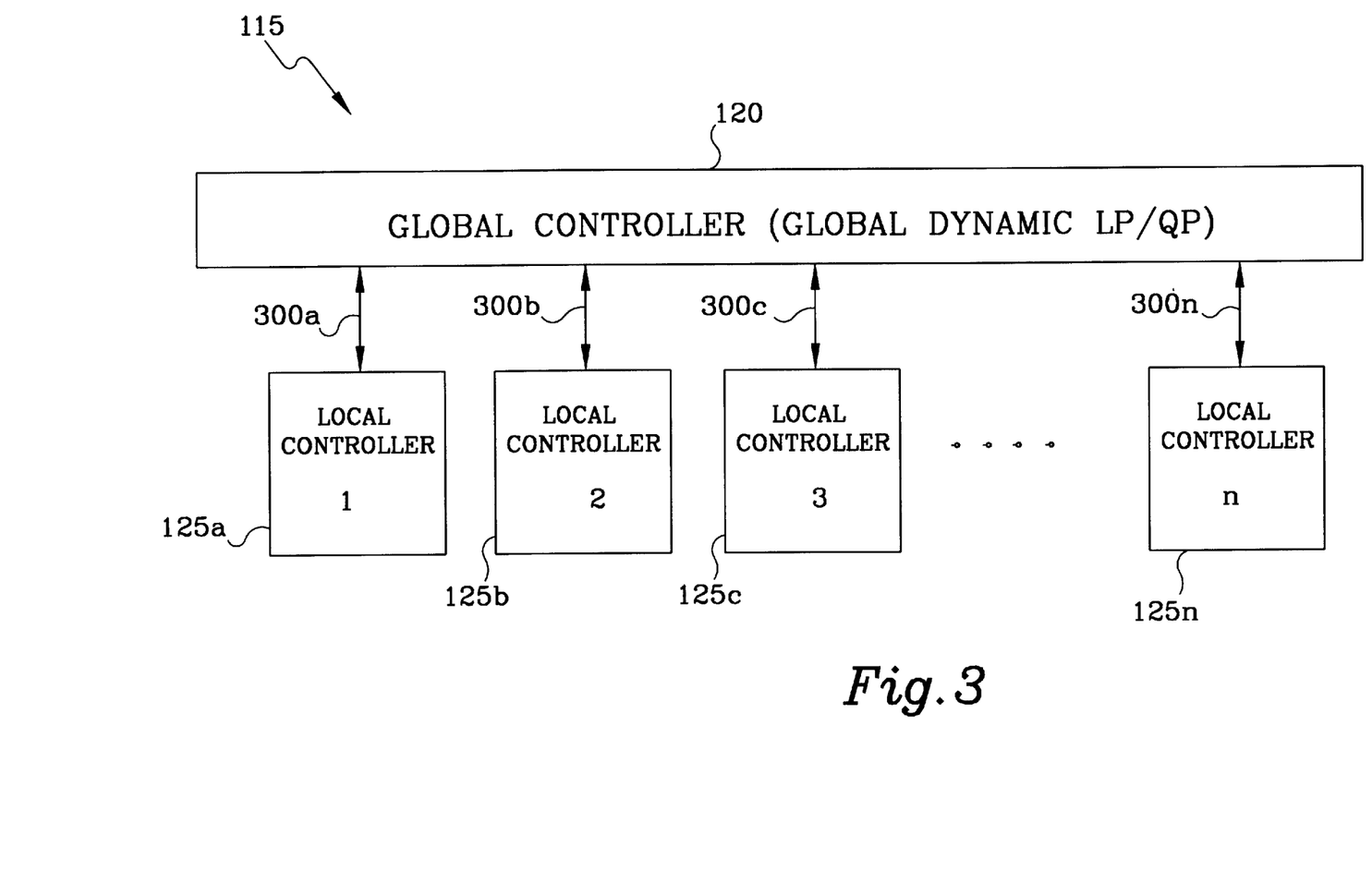
FIG. 3 illustrates a block diagram of exemplary control system that includes a global controller and a plurality of local controllers in accordance with the principles of the present invention.

Turning now to FIG. 3, illustrated is a block diagram of exemplary control system 115 that includes global controller 120 (dynamic linear program/quadratic program ("DLP/QP")) and a plurality of local controllers 125a to 125n (e.g., RMPC structure of FIG. 2), all in accordance with the principles of the present invention. It should be assumed that local controllers 125a to 125n are associated with associated processes 110 of FIG. 1.

Figure 4:
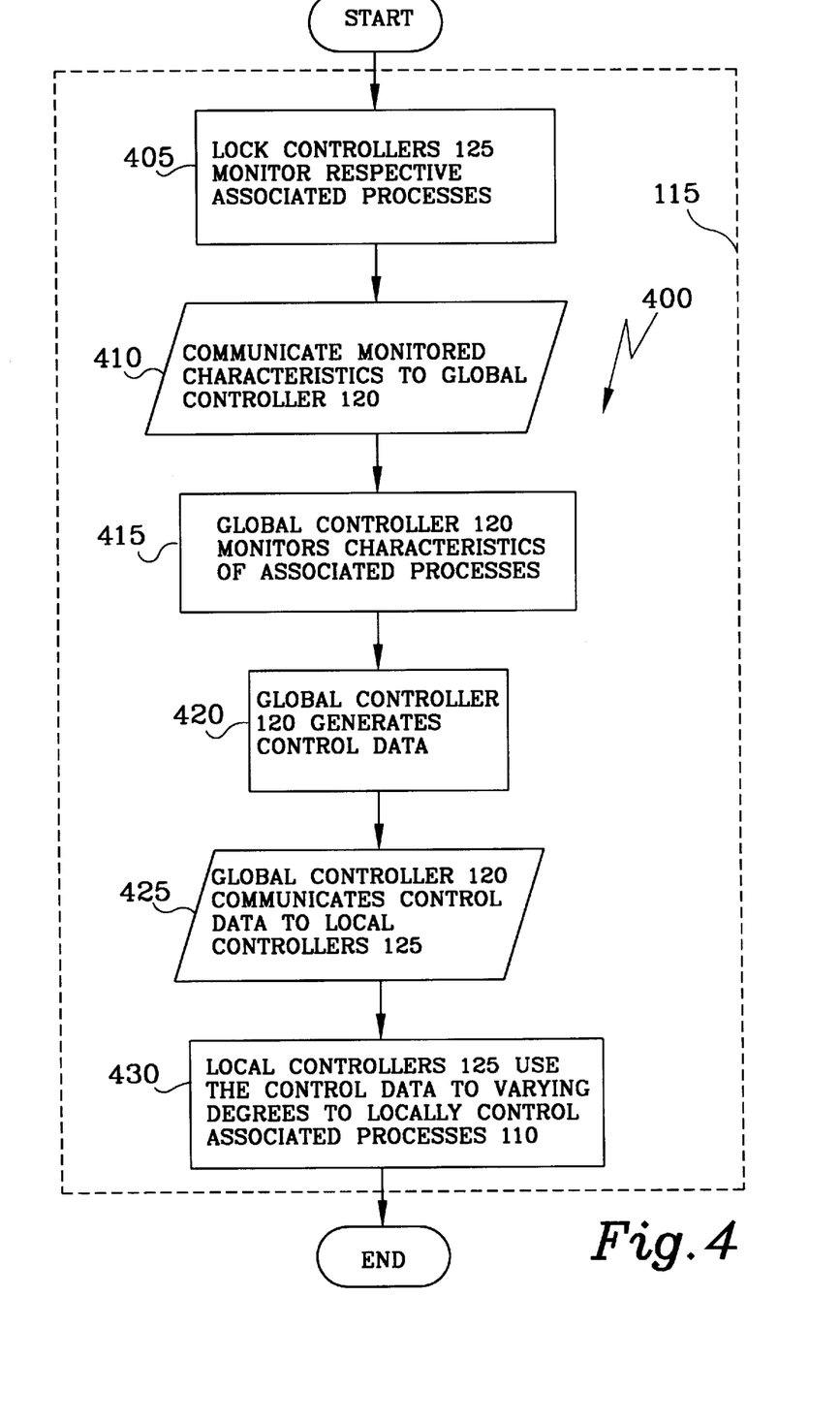
FIG. 4 illustrates a flow diagram of an exemplary method of operating the control system of FIGS. 1 and 3 to globally optimize a process facility in accordance with the principles of the present invention.

According to the illustrated embodiment, an important aspect or feature of the relationship between controllers 120 and 125 is a constant, preferably dynamic, communication of characteristics of associated processes 110 between the controllers via conventional communication paths 300a to 300n (synchronous or asynchronous) For the purposes of illustration, concurrent reference is now made to FIG. 4, which illustrates a flow diagram of an exemplary method (generally designated 400) of operating control system 115 to globally optimize a process facility in accordance with the principles of the present invention.

To begin, each of local controllers 125 continuously monitors respective associated processes 110, process step 405, and particularly, characteristics of associated processes 110, such as output and other measurable data incident thereto, including pressure, temperature, or the like (e.g., CVs).

Local controllers 125 communicate such monitored characteristics to global controller 120, input/output step 410. Global controller 120 consequently globally monitors associated processes 110 by indirectly monitoring characteristics of associated processes 110 through local controllers 125, process step 415. Of course, in alternate embodiments, global controller 120 may suitably globally monitor associated processes 110 directly.

According to the illustrated embodiment, global controller 120 has an economic objective function (J) that is equal, at 5 Tau, to a summation of dynamic LP/QP coefficients (linear/quadratic objective functions) of local controllers 125, such that:

$$J = LP/QP1 + LP/QP2 + LP/QP3 + \ldots + LP/QPn$$

Each local controller 125 preferably updates its CV predictions and constraints according to the embodiment of FIG. 2, and communicates model information (e.g., on-the-fly model updates), dynamic predictions, current CV, MV, DV values, status and constraints, objective functions, etc.

Global controller 120 generates, in response to such monitored characteristics, control data for dynamically optimizing process facility 100, process step 420. Global controller 120 combines the multiple dynamically received LP/QP coefficients as set forth above to solve for a global LP/QP (control data according to the illustrated embodiment). Thus, exemplary global controller 120 uses an economic-based optimization parameter, although in alternate embodiments, any suitable at least substantially global (facility-wide) optimization algorithm, procedure, equation or the like may be used.

Global controller 120 communicates the control data to local controllers 125, input/output step 425. Local controllers 125 use the control data, to varying degrees, to locally control associated processes 110 to optimize process facility 100, process step 430. The optimization solution is thus integrated into each local controller (RMPCT control solution) 125.

An important aspect of above-described steps is that the control data provides a dynamically updates global steady state optimization solution for process facility 100. This global solution is used, to varying degrees, by local controllers 125 to optimize associated processes 110 in response to a desired facility-wide optimization solution, which may be largely economic-based.

Recall, as set forth hereinabove, such varying degrees of compliance with the control data may suitably range between compliance and noncompliance with the same. Local controllers 125 may dynamically vary their respective degree (range) of compliance. According to the illustrated embodiment, a particular local controller 125 may have a cooperative association, a direct association, or "Pro-Only" (on your own) association with the control data.

In a cooperative association (preferred default), global controller 120 communicates the control data as MV desired values to local controller 125, and local controller 125's Local LP/QP 215 is executed—finding a preferred point that conforms to the communicated MV desired values. This approach may be advantageously used when that which is desirable for each process is also desirable for the facility as a whole. In a preferred embodiment, global controller 120 solves the steady state dynamic LP/QP optimization globally:

$$\min_{u^{DQP}} QP_1 + QP_2 + \cdots + QP_n$$

(all DLP/QP's MV/CV constraints). Local controller 125 solves the steady state dynamic LP/QP optimization locally:

$$\min_{x_{ss}} \sum (x_{ss_j} - u_j^{DQP})^2$$

(all RMPCT's MV/CV constraints), and augments RCA to solve for the optimal path:

$$\min_{x, y} \frac{1}{2} \left\| \begin{bmatrix} W \\ W_o \end{bmatrix} \left( \begin{bmatrix} A \\ S \end{bmatrix} x - \begin{bmatrix} y \\ x_{ss} \end{bmatrix} \right) \right\|_2^2$$

(all RMPCT's MV/CV dynamic constraints).

In a direct association, global controller 120 communicates the control data as MV final values to local controller 125, and local controller 125's Local LP/QP 215 is bypassed—local controller 125 takes a directive (MV final values) as the preferred point. This approach may be advantageously used when that which is desirable for each process is not desirable for the facility as a whole. In a preferred embodiment, global controller 120 solves the steady state dynamic LP/QP optimization globally:

$$\min_{u^{DQP}} QP_1 + QP_2 + \cdots + QP_n$$

(all DLP/QP's MV/CV constraints). Local controller 125 bypasses the steady state dynamic LP/QP optimization locally, and augments RCA to solve for the optimal path:

$$\min_{x, y} \frac{1}{2} \left\| \begin{bmatrix} W \\ W_o \end{bmatrix} \left( \begin{bmatrix} A \\ S \end{bmatrix} x - \begin{bmatrix} y \\ u_k^{DQP} \end{bmatrix} \right) \right\|_2^2$$

(all RMPCT's MV/CV dynamic constraints).

In a Pro-Only association, global controller 120 communicates the control data as operator-specified desired values to local controller 125, and local controller 125's Local LP/QP 215 is executed—local controller 125 selects a "desired" portion of the control data and disregards an undesired portion of the same. This approach may be advantageously used when cooperative and direct associations are deemed undesirable for the facility as a whole. In a preferred embodiment, global controller 120 solves the steady state dynamic LP/QP optimization globally:

$$\min_{u^{DQP}} QP_1 + QP_2 + QP_n$$

(all DLP/QP's MV/CV constraints). Local controller 125 solves the steady state dynamic LP/QP optimization locally:

$$\min_{x_{ss}} \sum [\alpha_j^u (z_{ss_j} - u_j^{DQP})]^2 +$$
$$\sum [\alpha_i^y (G_i x_{ss} - y_i^{DQP})]^2 + \sum \beta_j^u x_{ss_j} + \sum \beta_i^y G_i x_{ss}$$

(all RMPCT's MV/CV constraints), and augments RCA to solve for the optimal path:

$$\min_{x, y} \frac{1}{2} \left\| \begin{bmatrix} W \\ W_o \end{bmatrix} \left( \begin{bmatrix} A \\ S \end{bmatrix} x - \begin{bmatrix} y \\ x_{ss} \end{bmatrix} \right) \right\|_2^2$$

(all RMPCT's MV/CV dynamic constraints).

In alternate embodiments, multiple local controllers 125 may have various static degrees of compliance, or in some combination of the same. In addition, it should again be noted that global controller 120 is termed "global" because it monitors all, or at least a substantial number, of associated processes 110, which may be accomplished directly, indirectly, or through a suitable combination thereof. Those skilled in the art should understand that although the functions of global controller 120 have been illustrated as being centralized in the illustrated embodiments hereof, such functionality may be suitably distributed throughout process facility 100. Similarly, local controllers 125 are termed "local" because each is associated with a specific one or group of associated processes 110, and this is regardless of the physical location or proximity of the local controllers with respect to associated processes 110. Those skilled in the art should therefore also understand that although the functions of local controllers 125 have been illustrated as being distributed in the illustrated embodiments hereof, such functionality may be suitably centralized somewhere in process facility 100. The functionality of controllers 120 and 125 may be suitably collectively distributed or centralized, or partially distributed and centralized, all depending upon the needs of the process facility to be controlled.

Although the present invention and its advantages have been described in detail, those skilled in the art should understand that they can make various changes, substitutions and alterations herein without departing from the spirit and scope of the invention in its broadest form.

What is claimed is:

1. A control system for controlling associated processes within a process facility, comprising:
   a global controller that monitors said associated processes and generates, in response thereto, control data for optimizing said process facility; and
   local controllers having a dynamic prediction task and a local linear program/quadratic program optimization task, said local controllers operating in accordance with said control data to varying degrees to predict, optimize and control said associated processes and thereby cooperate with said global controller to optimize said process facility.

2. The control system recited in claim 1 wherein said local controllers monitor said associated processes.

3. The control system recited in claim 1 wherein said global controller generates said control data as a function of an optimization parameter.

4. The control system recited in claim 3 wherein said optimization parameter is economic-based.

5. The control system recited in claim 1 wherein said global controller monitors characteristics of said associated processes.

6. The control system recited in claim 5 wherein said monitored characteristics include output data of said associated processes.

7. The control system recited in claim 5 wherein said monitored characteristics are communicated between said global controller and said local controllers.

8. The control system recited in claim 1 wherein said varying degrees of said local controllers range between compliance and noncompliance with said control data.

9. The control system recited in claim 1 wherein a particular local controller has a degree of compliance.

10. The control system recited in claim 1 wherein said global controller is centralized.

11. The control system recited in claim 1 wherein ones of said local controllers are proximate to ones of said associated processes.

12. The control system recited in claim 1 wherein said local controllers are distributed.

13. A method of operating a control system for controlling associated processes within a process facility, comprising the steps of:
   globally monitoring said associated processes and generating, in response thereto, control data for optimizing said process facility; and
   locally predicting, optimizing and controlling said associated processes with a local linear program/quadratic program optimization task, to varying degrees, in accordance with said control data to optimize said process facility.

14. The method of operation recited in claim 13 wherein said further comprising the step of locally monitoring said associated processes.

15. The method of operation recited in claim 13 wherein said generating step comprises the step of using an optimization parameter.

16. The method of operation recited in claim 15 wherein said optimization parameter is economic-based.

17. The method of operation recited in claim 13 wherein said globally monitoring step comprises the step of monitoring characteristics of said associated processes.

18. The method of operation recited in claim 17 wherein said monitored characteristics include output data of said associated processes.

19. The method of operation recited in claim 17 further comprising the step of communicating said monitored characteristics between local controllers and a global controller.

20. The method of operation recited in claim 13 wherein said varying degrees range between compliance and noncompliance with said control data.

21. The method of operation recited in claim 13 further comprising the step of using a particular local controller to control a particular one of said associated processes, said particular local controller complying with said control data.

22. The method of operation recited in claim 13 wherein said step of locally controlling is distributed.

23. A control system for controlling associated processes within a process facility, comprising:
   a global controller that monitors characteristics of said associated processes and generates, in response thereto, control data for optimizing said process facility; and
   local controllers having a dynamic prediction task and a local linear program/quadratic program optimization task, said local controllers monitoring said associated processes and operating in accordance with said control data to varying degrees to predict, optimize and control said monitored associated processes, thereby cooperating with said global controller to optimize said process facility.

24. The control system recited in claim 23 wherein said global controller generates said control data as a function of an optimization parameter.

25. The control system recited in claim 24 wherein said optimization parameter is economic-based.

26. The control system recited in claim 23 wherein said monitored characteristics are communicated between said global controller and said local controllers.

27. The control system recited in claim 23 wherein said varying degrees of said local controllers range between compliance and noncompliance with said control data.

28. The control system recited in claim 23 wherein a particular local controller has a degree of compliance.

29. The control system recited in claim 23 wherein said global controller is centralized and said process controllers are distributed.

30. The control system recited in claim 23 wherein ones of said local controllers are proximate to ones of said associated processes.

31. A control system for controlling associated processes within a process facility, comprising:
   a global controller that monitors said associated processes and generates, in response thereto, control data for optimizing said process facility; and
   local controllers having a dynamic prediction task, an optimization task and a dynamic control/optimization augmented range control algorithm, said local controllers operating in accordance with said control data to varying degrees to predict, optimize and control said associated processes and thereby cooperate with said global controller to optimize said process facility.

32. The control system recited in claim 31 wherein said local controllers monitor said associated processes.

33. The control system recited in claim 31 wherein said global controller generates said control data as a function of an optimization parameter.

34. The control system recited in claim 33 wherein said optimization parameter is economic-based.

35. The control system recited in claim 31 wherein said global controller monitors characteristics of said associated processes.

36. The control system recited in claim 35 wherein said monitored characteristics include output data of said associated processes.

37. The control system recited in claim 35 wherein said monitored characteristics are communicated between said global controller and said local controllers.

38. The control system recited in claim 31 wherein said varying degrees of said local controllers range between compliance and noncompliance with said control data.

39. The control system recited in claim 31 wherein a particular local controller has a degree of compliance.

40. The control system recited in claim 31 wherein said global controller is centralized.

41. The control system recited in claim 31 wherein ones of said local controllers are proximate to ones of said associated processes.

42. The control system recited in claim 31 wherein said local controllers are distributed.

43. A method of operating a control system for controlling associated processes within a process facility, comprising the steps of:

globally monitoring said associated processes and generating, in response thereto, control data for optimizing said process facility; and     locally predicting, optimizing and controlling said associated processes based upon a dynamic control/optimization augmented range control algorithm, to varying degrees, in accordance with said control data to optimize said process facility.

44. The method of operation recited in claim 43 wherein said further comprising the step of locally monitoring said associated processes.

45. The method of operation recited in claim 43 wherein said generating step comprises the step of using an optimization parameter.

46. The method of operation recited in claim 45 wherein said optimization parameter is economic-based.

47. The method of operation recited in claim 43 wherein said globally monitoring step comprises the step of monitoring characteristics of said associated processes.

48. The method of operation recited in claim 47 wherein said monitored characteristics include output data of said associated processes.

49. The method of operation recited in claim 47 further comprising the step of communicating said monitored characteristics between local controllers and a global controller.

50. The method of operation recited in claim 43 wherein said varying degrees range between compliance and noncompliance with said control data.

51. The method of operation recited in claim 43 further comprising the step of using a particular local controller to control a particular one of said associated processes, said particular local controller complying with said control data.

52. The method of operation recited in claim 43 wherein said step of locally controlling is distributed.

53. A control system for controlling associated processes within a process facility, comprising:

a global controller that monitors characteristics of said associated processes and generates, in response thereto, control data for optimizing said process facility; and     local controllers having a dynamic prediction task, an optimization task and a dynamic control/optimization augmented range control algorithm, said local controllers monitoring said associated processes and operating in accordance with said control data to varying degrees to predict, optimize and control said monitored associated processes, thereby cooperating with said global controller to optimize said process facility.

54. The control system recited in claim 53 wherein said global controller generates said control data as a function of an optimization parameter.

55. The control system recited in claim 54 wherein said optimization parameter is economic-based.

56. The control system recited in claim 53 wherein said monitored characteristics are communicated between said global controller and said local controllers.

57. The control system recited in claim 53 wherein said varying degrees of said local controllers range between compliance and noncompliance with said control data.

58. The control system recited in claim 53 wherein a particular local controller has a degree of compliance.

59. The control system recited in claim 53 wherein said global controller is centralized and said process controllers are distributed.

60. The control system recited in claim 53 wherein ones of said local controllers are proximate to ones of said associated processes.

\* \* \* \* \*